United States Patent
Payton et al.

(10) Patent No.: US 11,569,848 B2
(45) Date of Patent: Jan. 31, 2023

(54) SOFTWARE-DEFINED RADIO LINKING SYSTEMS

(71) Applicant: Parsons Corporation, Centreville, VA (US)

(72) Inventors: Joseph Payton, Fredericksburg, VA (US); Nicholas E. Ortyl, III, Bedford, MA (US); Stephen Hernandez, Silver Spring, MD (US); Samantha S. Palmer, Henrico, VA (US)

(73) Assignee: PARSONS CORPORATION, Centreville, VA (US)

( * ) Notice: Subject to any disclaimer, the term of this patent is extended or adjusted under 35 U.S.C. 154(b) by 182 days.

(21) Appl. No.: 17/231,195

(22) Filed: Apr. 15, 2021

(65) Prior Publication Data
US 2022/0077877 A1 Mar. 10, 2022

Related U.S. Application Data

(60) Provisional application No. 63/011,757, filed on Apr. 17, 2020.

(51) Int. Cl.
*H04L 12/28* (2006.01)
*H04B 1/00* (2006.01)
(Continued)

(52) U.S. Cl.
CPC .......... *H04B 1/0003* (2013.01); *H04L 41/12* (2013.01); *H04W 56/0015* (2013.01); *H04W 84/10* (2013.01)

(58) Field of Classification Search
CPC ....... H04B 1/0003; H04L 41/12; H04L 45/02; H04L 45/00; H04L 45/04; H04W 56/0015; H04W 84/10; H04W 84/18
See application file for complete search history.

(56) References Cited

U.S. PATENT DOCUMENTS 5,365,592 A 11/1994 Horner et al.
5,426,438 A 6/1995 Peavey et al.
(Continued)

FOREIGN PATENT DOCUMENTS

CN 201476875 5/2010
CN 101826889 9/2010
(Continued)

OTHER PUBLICATIONS

Wassie Dereje Assefa et al., "An Agile Multi-Node Multi-Antenna Wireless Channel Sounding System", IEEE Access, vol. 7, (Jan. 31, 2019), pp. 17503-17516.
(Continued)

*Primary Examiner* — Phuongchau Ba Nguyen
(74) *Attorney, Agent, or Firm* — Martensen IP; Michael C. Martensen

(57) ABSTRACT

The disclosed invention includes methods for linking individual software-defined radios (SDR) into a cohesive network of SDRs capable of recording a sample of radiofrequency (RF) signals emitted in an RF environment. Individual SDRs communicate with an IP network, and host a linking application that executes the recording. A user identifies a lead SDR from among the SDRs, and uses the lead SDR to task participating SDRs with reference to a clock source. Also disclosed is a system of SDRs configured to be linked into a cohesive network of SDRs capable of recording a sample of RF signals emitted in an RF environment. Embodiments of the disclosed invention include colocated and dispersed SDRs. Some embodiments use SDRs organized into a mesh network. Embodiments of the disclosed invention are configured to perform total band monitoring, total band capture, RF environment simulation, interference identification, interference simulation, and
(Continued)

distributed quality of service evaluation of wireless networks.

23 Claims, 9 Drawing Sheets

(51) Int. Cl.
*H04L 41/12* (2022.01)
*H04W 56/00* (2009.01)
*H04W 84/10* (2009.01)

(56) References Cited

U.S. PATENT DOCUMENTS

| | | | |
|---|---|---|---|
| 5,436,847 | A | 7/1995 | Schroer et al. |
| 5,867,535 | A | 2/1999 | Phillips et al. |
| 6,078,736 | A | 6/2000 | Guccione |
| 6,539,438 | B1 | 3/2003 | Ledzius et al. |
| 6,874,145 | B1 | 3/2005 | Ye |
| 6,898,235 | B1 | 5/2005 | Carlin et al. |
| 7,210,121 | B2 | 4/2007 | Xia et al. |
| 7,317,761 | B2 | 1/2008 | Lozhkin |
| 7,320,062 | B2 * | 1/2008 | Master .................. G06F 7/57 |
| | | | 712/15 |
| 7,349,503 | B2 | 3/2008 | Husted et al. |
| 7,366,246 | B2 | 4/2008 | Walker et al. |
| 7,369,485 | B2 | 5/2008 | Halford et al. |
| 7,403,505 | B2 | 7/2008 | Yoon et al. |
| 7,404,074 | B2 * | 7/2008 | Murotake ............... H04B 1/406 |
| | | | 713/1 |
| 7,430,257 | B1 | 9/2008 | Shattil |
| RE41,130 | E | 2/2010 | Fette et al. |
| 7,684,467 | B2 | 3/2010 | Li et al. |
| 7,929,937 | B2 | 4/2011 | Koivunen et al. |
| 7,937,601 | B2 | 5/2011 | Bakker et al. |
| 7,987,151 | B2 | 7/2011 | Schott et al. |
| 7,987,432 | B1 | 7/2011 | Grechishkin et al. |
| 7,990,912 | B2 * | 8/2011 | Nix, Jr. ................. H04W 88/08 |
| | | | 455/448 |
| 8,086,836 | B2 | 12/2011 | Chong et al. |
| 8,364,946 | B2 | 1/2013 | Ishebabi |
| 8,412,111 | B2 | 4/2013 | Talwar et al. |
| 8,615,206 | B2 | 12/2013 | Meng |
| 8,677,378 | B2 | 3/2014 | Murotake et al. |
| 8,763,004 | B1 | 6/2014 | Callahan, III |
| 8,850,411 | B2 | 9/2014 | Kelem et al. |
| 9,661,515 | B2 * | 5/2017 | Lord .................... H04W 24/02 |
| 9,663,659 | B1 | 5/2017 | Harlow |
| 10,791,477 | B1 * | 9/2020 | Earnhardt, Jr. ..... H04B 7/18506 |
| 2002/0154210 | A1 * | 10/2002 | Ludwig .................. H04L 51/00 |
| | | | 348/E7.083 |
| 2003/0011514 | A1 | 1/2003 | Krichofer et al. |
| 2004/0093595 | A1 | 5/2004 | Bilange |
| 2005/0120346 | A1 | 6/2005 | Sprigg |
| 2005/0125513 | A1 | 6/2005 | Sin-Ling Lam et al. |
| 2006/0195840 | A1 | 8/2006 | Sundarrajan et al. |
| 2006/0218549 | A1 | 9/2006 | Hsu et al. |
| 2006/0248445 | A1 | 11/2006 | Rogerson et al. |
| 2007/0256073 | A1 | 11/2007 | Troung et al. |
| 2008/0040507 | A1 | 2/2008 | Hsu et al. |
| 2008/0134143 | A1 | 6/2008 | Hoerentrup et al. |
| 2008/0147705 | A1 | 6/2008 | Bansal et al. |
| 2008/0198948 | A1 | 8/2008 | Tang |
| 2008/0318544 | A1 | 12/2008 | Wang et al. |
| 2009/0031396 | A1 | 1/2009 | Jung et al. |
| 2009/0119773 | A1 | 5/2009 | D'Amore |
| 2009/0129493 | A1 | 5/2009 | Zhang et al. |
| 2009/0170444 | A1 * | 7/2009 | Retnasothie ......... H04B 1/0039 |
| | | | 455/73 |
| 2009/0215390 | A1 | 8/2009 | Ku et al. |
| 2009/0279626 | A1 | 11/2009 | Wang |
| 2009/0287894 | A1 | 11/2009 | Renno |
| 2009/0290552 | A1 | 11/2009 | Bertorelle |
| 2009/0307540 | A1 | 12/2009 | Razazian et al. |
| 2009/0313620 | A1 | 12/2009 | Sedukhin et al. |
| 2010/0086074 | A1 | 4/2010 | Chen et al. |
| 2010/0138501 | A1 | 6/2010 | Clinton et al. |
| 2010/0142643 | A1 | 6/2010 | Ueda et al. |
| 2010/0202574 | A1 | 8/2010 | Chen et al. |
| 2010/0205274 | A1 | 8/2010 | Gharabally et al. |
| 2010/0226454 | A1 | 9/2010 | Bliss et al. |
| 2010/0235261 | A1 | 9/2010 | Lloyd et al. |
| 2010/0306773 | A1 | 12/2010 | Lee et al. |
| 2010/0319051 | A1 | 12/2010 | Bafna et al. |
| 2011/0296412 | A1 | 12/2011 | Banga et al. |
| 2012/0023194 | A1 | 1/2012 | Ruiz-Velasco et al. |
| 2012/0030672 | A1 | 2/2012 | Zygmuntowicz et al. |
| 2012/0036552 | A1 | 2/2012 | Dare et al. |
| 2012/0054184 | A1 | 3/2012 | Masud et al. |
| 2012/0066679 | A1 | 3/2012 | Pappas et al. |
| 2012/0151479 | A1 | 6/2012 | Kothari |
| 2012/0303695 | A1 | 11/2012 | Michel et al. |
| 2013/0061222 | A1 | 3/2013 | Hwang et al. |
| 2013/0067089 | A1 | 3/2013 | Synytskyy et al. |
| 2013/0102254 | A1 | 4/2013 | Cyzs et al. |
| 2013/0111328 | A1 | 5/2013 | Khanna et al. |
| 2013/0147622 | A1 * | 6/2013 | LaLonde ................ G16H 10/60 |
| | | | 340/539.12 |
| 2013/0167135 | A1 | 6/2013 | Neumann et al. |
| 2013/0181867 | A1 | 7/2013 | Sturdivant et al. |
| 2013/0191495 | A1 | 7/2013 | Almstrand et al. |
| 2013/0198734 | A1 | 8/2013 | Biswas et al. |
| 2013/0212559 | A1 | 8/2013 | Lehtimaki et al. |
| 2013/0227565 | A1 | 8/2013 | Lee et al. |
| 2013/0283400 | A1 | 10/2013 | Schneider et al. |
| 2013/0308940 | A1 | 11/2013 | Kpodzo et al. |
| 2013/0326499 | A1 | 12/2013 | Mowatt et al. |
| 2013/0332991 | A1 | 12/2013 | Rivera |
| 2013/0346965 | A1 | 12/2013 | Conlan et al. |
| 2014/0007048 | A1 | 1/2014 | Qureshi et al. |
| 2014/0007122 | A1 | 1/2014 | Udeshi et al. |
| 2014/0072947 | A1 | 3/2014 | Boguraev |
| 2014/0079235 | A1 | 3/2014 | Lyons |
| 2014/0269374 | A1 | 9/2014 | Abdelmonem et al. |
| 2015/0270917 | A1 | 9/2015 | Roman et al. |
| 2015/0356431 | A1 | 12/2015 | Saxena |
| 2017/0011625 | A1 | 1/2017 | Stelzig et al. |
| 2017/0094527 | A1 * | 3/2017 | Shattil .................... H04K 3/45 |
| 2018/0014217 | A1 | 1/2018 | Kleinbeck et al. |
| 2019/0346533 | A1 | 11/2019 | Robinson et al. |
| 2020/0136744 | A1 * | 4/2020 | Shah .................. H04L 27/0006 |
| 2020/0162559 | A1 | 5/2020 | Sustaeta et al. |
| 2020/0242516 | A1 | 7/2020 | Dhingra et al. |
| 2021/0327308 | A1 * | 10/2021 | Payton .................. G06K 9/6265 |

FOREIGN PATENT DOCUMENTS

| | | |
|---|---|---|
| CN | 202794534 | 3/2013 |
| CN | 102158242 | 7/2013 |
| CN | 110007991 A | 7/2019 |
| DE | 102007034851 | 1/2009 |
| EP | 3065324 A1 | 9/2016 |
| GB | 2344729 A | 6/2000 |
| KR | 20020016434 | 3/2002 |

OTHER PUBLICATIONS

Stanciu Valentin et al., "Data Collection for Spectrum Sensing Algorithms Based on USRP", 2014 10th International Conferfence on Communications (COMM), IEE, (May 29, 2014), pp. 1-4.

Patent Cooperation Treaty Application No. PCT/US2021/014161, International Search Report and Written Opinion, Applicant Parsons Corporation, dated May 10, 2021.

Patent Cooperation Treaty Application No. PCT/US2021/027640, International Search Report and Written Opinion, Applicant Parsons Corporation, dated Jul. 28, 2021.

Patent Cooperation Treaty Application No. PCT/US2021/026130, International Search Report and Written Opinion, Applicant Parsons Corporation, dated Jun. 18, 2021.

Axell, Erik, et al., "Optimal and Sub-Optimal Spectrum Sensing of OFDM Signals in Known and Unknown Noise Variance." IEEE

(56) References Cited

OTHER PUBLICATIONS

Journal on Selected Areas in Communications, vol. 29, No. 2, Feb. 2011, pp. 290-304.
Bokharaiee, Simin, "Blind Spectrum Sensing for OFDM-Based Cognitive Radio Systems." IEEE Transactions on Vehicular Technology, vol. 60, No. 3, Mar. 2011, pp. 858-871.
Chen, Hou-Shin, et al., "Spectrum Sensing for OFDM Systems Employing Pilot Tones," IEEE Transactions on Wireless Communications, vol. 8, No. 12, Dec. 2009, pp. 5862-5870.
Rui, Yun, "Frequency Domain Discrete Fourier Transform Spread Generalized Multi-Carrier System and Its Performance Analysis," Computer Communications 32 (2009), pp. 456-464.
Ehringer, "The Dalvik Virtual Machine Architecture", 8 pages, (Mar. 2010).
Li, et al., "XVM: A Bridge Between XML Data and Its Behavior", pp. 155-163, (May 17-22, 2004).
Slade, et al., "Reconfigurable Computing Application Frameworks," Brigham Young University, 10 pages (2003).
Boano, et al., "Controllable Radio Interference for Experimental and Testing Purposes in Wireless Sensor Networks," www.soda.swedish-ict.se, 8 pages (Apr. 20, 2015).
Spirent Communications of Eatontown, L.P., "Spirent Communications TAS 4600A Noise and Interference Emulator Operations Manual," 168 pages (2001).
ITU, "Radio Regulations of the International Telecommunication Union Radiocommunication Sector (ITU-R) (2012 Ed.)", 432 pages (2012).

Al-Khateeb et al. "Recurring and Novel Class Detection Using Class-Based Ensemble for Evolving Data Stream", IEEE Transactions on Knowlede and Data Engineering, IEEE Service Center, Los Alamitos, CA, US, vol. 28, No. 10, Oct. 1, 2016, pp. 2752-2764.
Patent Cooperation Treaty Application No. PCT/US2020/046808, International Search Report and Written Opinion, Applicant Parsons Corporation, dated Nov. 18, 2020.
Patent Cooperation Treaty Application No. PCT/US2020/055369, International Search Report and Written Opinion, Applicant Parsons Corporation, dated Feb. 5, 2021.
Mankun, Xu, et al. "A New Time-Frequency Spectrogram Analysis of FH Signals by Image Enhancement and Mathematical Morphology", Image and Graphics, 2007, ICIG 2007, Fourth International Conference on, IEEE, Piscataway, NJ, USA Aug. 1, 2007, pp. 610-615.
Simstad, Erik, et al. "Medical Image Segmentation on GPUs—A Comprehensive Review", Medical Image Analysis, vol. 20, No. 1, Feb. 1, 2015, pp. 1-18.
Chu-Carrol, Jennifer, et al. "A Multi-Strategy and Multi-Source Approach to Question Answering", Jan. 1, 2006, URL: https://www.egr.msu.edu/~jchai/QAPapers/ibm.prager.pdf, pp. 1-8.
Abderrazzak, Samadi, et al. "A Syntactic and Semantic Multi-Agent Based Question Answering System for Collaborative E-Learning", 2018 4th International Converence on Optimization and Applications (ICOA), IEEE, Apr. 26, 2018, pp. 1-4.
Patent Cooperation Treaty Application No. PCT/US2020/055370, International Search Report and Written Opinion, Applicant Parsons Corporation, dated Mar. 12, 2021.

\* cited by examiner

SOFTWARE-DEFINED RADIO LINKING SYSTEMS

CROSS-REFERENCE TO RELATED APPLICATIONS

This application claims priority to U.S. Provisional Application No. 63/011,757, filed Apr. 17, 2020; and has specification that builds upon U.S. application Ser. No. 14/265,211, filed Apr. 29, 2014; and PCT/US20/46808, filed Aug. 18, 2020; and PCT/US20/55370, filed Oct. 13, 2020; the disclosures of which are hereby incorporated herein by reference in their entirety.

BACKGROUND

Field of the Invention

Embodiments of the disclosed invention relate, in general, to Software-designed radio (SDR) networks, and more particularly to linking a plurality of Wide Band Transcorders (WBT) to operate as a single system.

Relevant Background

Software-defined radios, such as wide band transcorders, have inherent limitations on the amount of Radio Frequency ("RF") spectrum they can receive and process. As a result, certain military and civilian applications would require multiple SDR units with overlapping or complementary frequency ranges to capture or playback frequency-agile signals, to broadcast large RF signatures, e.g., military deception operations "MILDEC", or to gather a broad view of the RF environment. A common approach in the art is to assemble a number of SDRs into a single large rack-mounted system. However, large fixed systems are impractical as they cannot be quickly deployed to an area of interest. In addition, assembling many SDRs into a single system may not effectively utilize existing SDR resources, may be logistically inconvenient or difficult, and for many applications would not have the desired performance characteristics.

Therefore, it is apparent that a need exists for a system of dismounted, tactical devices connected via a network that are configured to act as one unified system or a series of smaller systems to allow for broader use cases and to enable the units to move where desired (and be separated by kilometers if using the mesh radio communication approach). These and other deficiencies of the prior art are addressed by one or more embodiments of the present invention. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out hereafter.

BRIEF DESCRIPTION OF THE DRAWINGS

Features and objects of the present invention and the manner of attaining them will become more apparent, and the invention itself will be best understood, by reference to the following description of one or more embodiments taken in conjunction with the accompanying drawings and figures imbedded in the text below and attached following this description.

Figure 1:
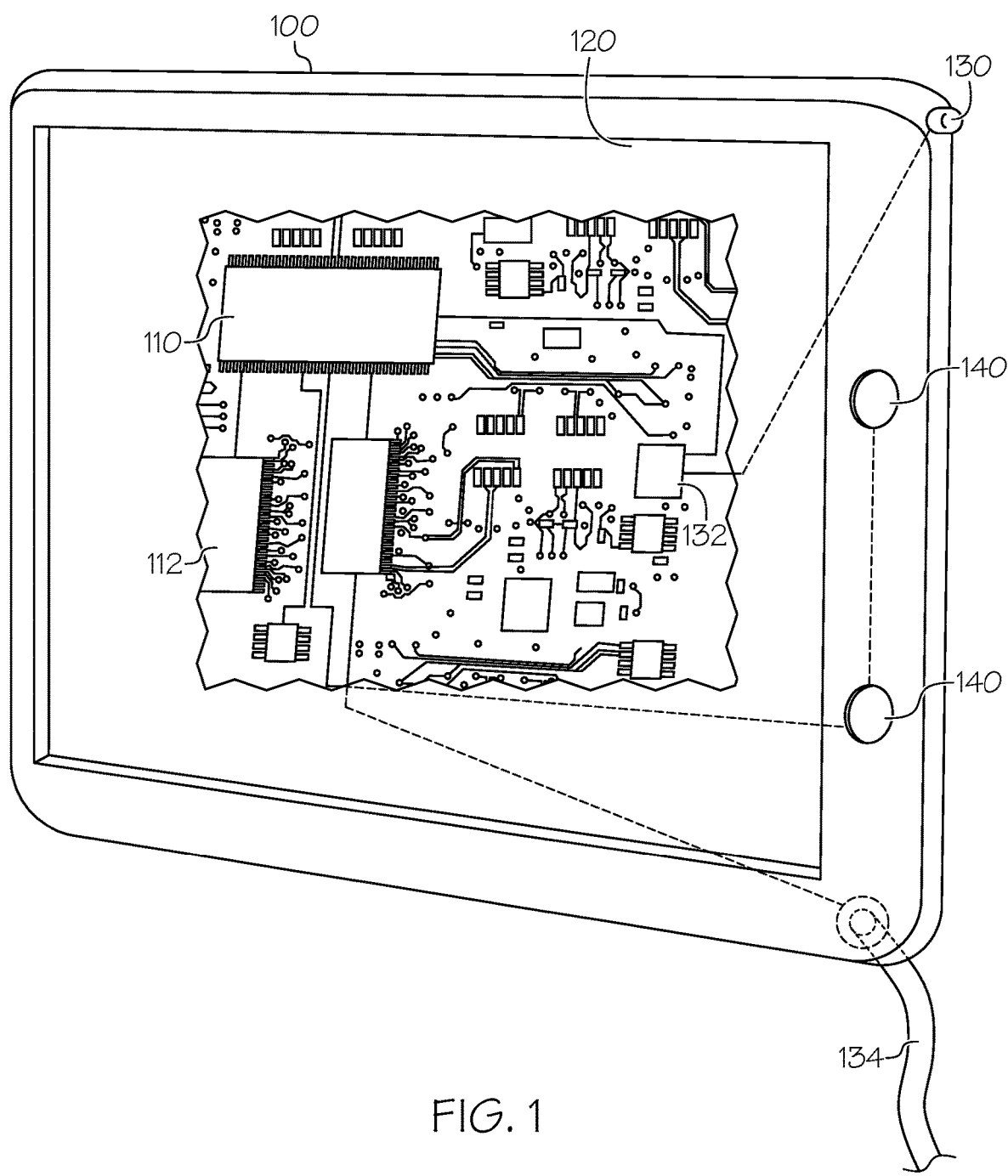
FIG. 1 depicts a cutaway view of an SDR as used with the disclosed invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DEFINITIONS

"Application" or "App" mean programs, code, processes, or operations stored on a SDR that implement reception and transforms of RF signals, storage of the RF signals, and/or playback of the RF signals.

"App Space" means one or more apps stored on an SDR that may perform transforms of RF signals.

"Artificial Intelligence" (AI) means a branch of computer science concerned with building smart machines capable of performing tasks that typically require human intelligence. AI is an interdisciplinary science with multiple approaches that allow machines to learn from experience, adjust to new inputs and perform human-like tasks. Using these technologies, computers can be trained to accomplish specific tasks by processing large amounts of data and recognizing patterns in the data.

"Intelligent Agent" or "Agent" means a program that can make decisions or perform a service based on its environment, experiences, and user input. It is an autonomous entity which acts, directing its activity towards achieving goals, upon an environment using observation through sensors and consequent actuators.

"Size, Weight, Power, and Cost" or "SWaP-C" means the hardware footprint of a piece of equipment or system. Swap-C refers to the optimization of the four hardware factors as weighed against the capabilities of the equipment or system.

"RF Spectrum" or "Radio Spectrum" means the part of the electromagnetic spectrum with frequencies from 30 cycles per second (hertz) to 300 billion cycles per second (GHz). Electromagnetic waves in this frequency range, called radio waves, are widely used in modern technology, particularly in telecommunications.

"RF Environment" means all of the transmissions in the RF spectrum propagating through a given geographic area.

"Bandwidth" means a range of frequencies within a given band, in particular those frequencies used for transmitting a signal.

"Software-defined radio" or "SDR" means a radio communication system implemented through software installed on a general or special purpose computer rather than through traditional hardware components, e.g., mixers, filters, amplifiers, modulators, signal detectors. A typical SDR may comprise a personal computer with a sound card linked to an RF front end. The computer's processor handles substantial portions of the signal processing, as opposed to the dedicated circuitry used in traditional radios. SDR systems are highly flexible as to radio protocols, and may accommodate a number of different and changing protocols in real time, e.g., cell phone services. SDRs can transmit using wideband, spread spectrum, and frequency hopping techniques to minimize interference within an RF environment. Further, a number of SDRs may be linked together into mesh networks reducing power requirements, size and interference caused by individual nodes in the network.

"Wide-Band Transcorder" or "WBT" means an SDR platform designed to record and replay any signal within the RF spectrum with a minimal SWaP-C footprint. The platform can be used for real-time or delayed analysis and manipulation of any signal captured in a particular RF environment. An exemplary device is capable of recording up to 100 million cycles per second (MHz) of RF spectrum at frequencies between 100 thousand cycles per second (kHz) and 18 GHz.

DETAILED DESCRIPTION

The disclosed invention is an application for use on networked SDRs, e.g., WBTs, that allows multiple SDRS to be configured and operated as a single, highly scalable RF signal recording and playback system. One embodiment of the disclosed invention allows for the use of a plurality of SDRs connected to a network and is configurable to accommodate both co-located and distributed SDR setups. The disclosed application allows for the linking of up to 128 SDRS on a single network so that the SDRs may be coordinated to accomplish a number of tasks, to include the following: monitoring of the entire band or RF Spectrum being used in an RF environment; recording the entire band or RF Spectrum being used in an RF environment; high fidelity simulation of an RF environment; identification and or simulation of interference sources; and the evaluation of the quality of service of distributed wireless networks.

The disclosed invention will now be described in detail with reference to several embodiments thereof as illustrated in the accompanying Figures. In the following description, numerous specific details are set forth in order to provide a thorough understanding of embodiments of the disclosed application. It will be apparent, however, to one skilled in the art that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

It should be apparent to those skilled in the art that the described embodiments of the disclosed invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Software Defined Radio Platform

Embodiments of the disclosed SDR linking system may be implemented using various SDRs, as long as the SDRs have sufficient basic processing and memory capabilities. With reference to FIG. 1, an example SDR 100 may include a processor 110 paired with internal memory 112. Internal memory 112 may be either volatile or non-volatile, and may be encrypted and secure. The processor 110 may provide output to, and receive input from, a touchscreen display panel 120, such as a resistive-sensing touchscreen, or the processor may include one or more buttons 140, a keypad, a keyboard, a mouse, or other input devices in addition to, or instead of, the touchscreen. SDRs used in the disclosed system may have one or more antennae 130 for transmitting and receiving radiofrequency (RF) signals that may be connected to a wireless data link and/or cellular telephone transceiver 132 coupled to the processor. In addition to the antennae, some SDRs may also include a wired RF connection 134, such as a coaxial cable or other RF input/output feature.

Figure 2:
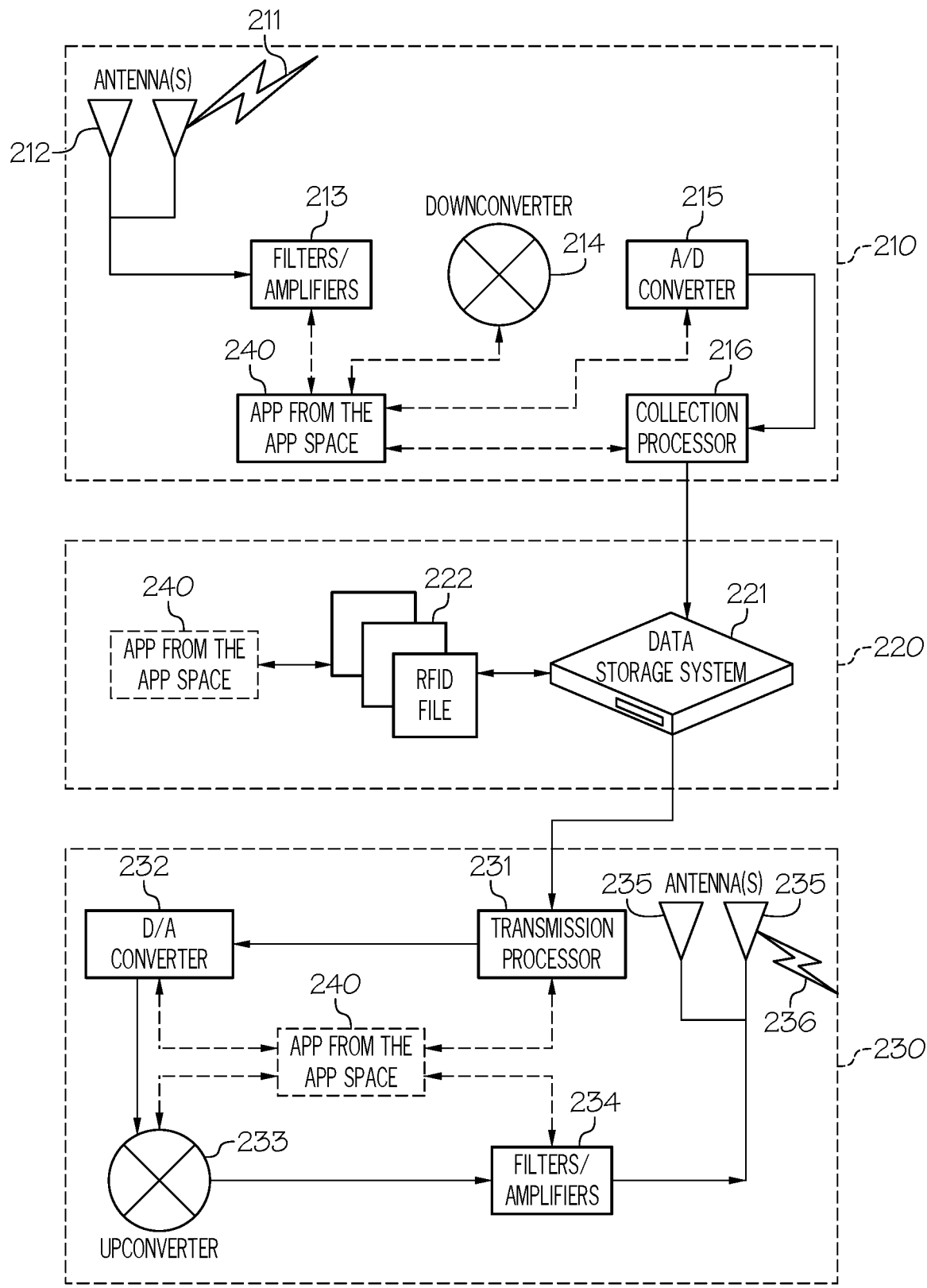
FIG. 2 depicts a block diagram of systems comprising an SDR.

FIG. 2 is a component block diagram illustrating three stages of RF signal processing on an SDR, respectively performed by a collection system 210, a data storage system 220, and a transmission system 230. The collection system is designed to receive RF signals 211 from the RF environment, and includes components to facilitate RF collection, e.g., filters/amplifiers 213, a digital downconverter 214, an analog-to-digital (A/D) converter 215, and a collection processor 216. The one or more antennas 212 may receive a wireless analog RF signal 211 propagating in the RF environment. In some SDRs, the collection system is configured to receive RF signals through a wired connection (not shown), such as a coaxial cable. A filters/amplifiers component 213, e.g., a high-pass filter, filters and/or amplifies the collected RF signal. The filtered/amplified RF signal is then passed to the downconverter 214 and afterward to the A/D converter 215. The A/D converter may use various approaches to convert the analog RF signal to a digital signal. Once converted, the digital RF signal may be passed to the collection processor 216 for additional manipulation before being stored in the data storage system 220.

Some SDRs include an application 240 (app) residing in an application space (App Space), wherein the app is configured to implement one or more of the filters/amplifiers component 213, the digital downconverter 214, the A/D converter 215, and the collection processor 216, and thereby perform transforms of the collected RF signal 211. In other words, the SDR may perform signal processing through an app that causes one or more of the components to apply various transforms to the analog RF signal as it is collected and readied for storage. For example, the app 240 may cause the A/D converter 215 to apply offsets and skewing algorithms that, among other things, adjusts the sampling rate of digital signals. Or the app may direct the collection processor 216 to segment the analog RF signal for easier processing and storage. In another example, the app 240 may instruct the downconverter 214 and the filters/amplifiers component 213 to control the frequencies of a received analog RF signal. Thus, various apps in the App Space may transform RF signals throughout signal collection by directing the function of one or more of the various collection system components.

In some SDRs, the data storage system includes a data storage component 221 that is configured to store the processed RF signals as RF digital data (RFD) files 222. The RFD files contain digital representations of received analog RF signals. In some embodiments, RFD file includes an in-phase amplitude measurement of the signal (I) and may also include a 90 degree (°) phase-shifted amplitude measurement of the signal (Q). RFD files may also contain "meta data" containing relevant information about the RFD files themselves. In some embodiments, an app 240 included in the App Space performs transformations on the digital signal stored in the RFD files 222. For example, the app 240 may increase the signal's gain or may apply other filters, effects, and other transforms. The app may combine multiple RFD Files into a composite RFD File by adding the processed signals together, and may also perform additional signal manipulation, as required. In addition to the tasks outlined above, the app 240 may also apply transforms traditionally classified as offline signal processing (i.e., signal processing that requires substantial computational power, or tasks that are otherwise impractical to implement in real time).

After processing and storage, the SDR may send the RF signal stored as RFD files 222 by the data storage system 220 to the transmission system 230 for playback. The transmission system 230 includes one or more of the following: a transmission processor 231, a digital-to-analog (D/A) converter 232, an upconverter 233, filters/amplifiers 234, and one or more antennas 235 for transmitting an analog signal 236. The transmission processor 231 manipulates the digital RF signal using various known techniques. In some embodiments, the transmission processor 231 and the collection processor 216 may be the same (e.g., a central-processing unit (CPU) or a digital signal processor (DSP). In other embodiments, the processors, are separate components (e.g., the transmission processor 231 may be a DSP and the collection processor 216 may be a CPU). In other embodiments, the processors are one or more cores in one or more multi-core processors, such as a quad- or dual-core DSP.

The transmission processor 231 then sends the digital RF signal to the D/A converter 232, which converts the digital RF signal to an analog signal. The D/A converter then sends the analog RF signal to an upconverter 233, which applies various other transforms to the analog signal before sending it to a filters/amplifiers component 234. The filters/amplifiers component applies additional transforms to the analog signal which is then sent to the antennas 235 for transmission as an RF signal 236. In some embodiments, the transmission system 230 uses a wired connection (not shown), e.g., a coaxial cable, to transmit the analog signal.

As discussed with respect to the collection system above, some embodiments of the transmission system include an app 240 that is configured to direct one or more of the components of the system, including the transmission processor 231, D/A converter 232, upconverter 233, and the filters/amplifiers component 234 to implement transforms to the stored digital RF signal. The app 240 implements various transforms to alter the stored digital signal and prepare it for transmission as an analog signal. Thus, depending on the particular embodiment, the apps 240 included in the App Space may perform various transforms during the stages of signal processing. In particular, the apps 240 apply transforms in the respective systems performing aspects of signal processing, i.e., the collection system 210, the data storage system 220, and the transmission system 230. In some embodiments, the apps perform transforms on the RF signals without altering the raw or original RF signal data, but in other embodiments, the apps do not preserve the original RF signal data when applying transforms.

Figure 3:
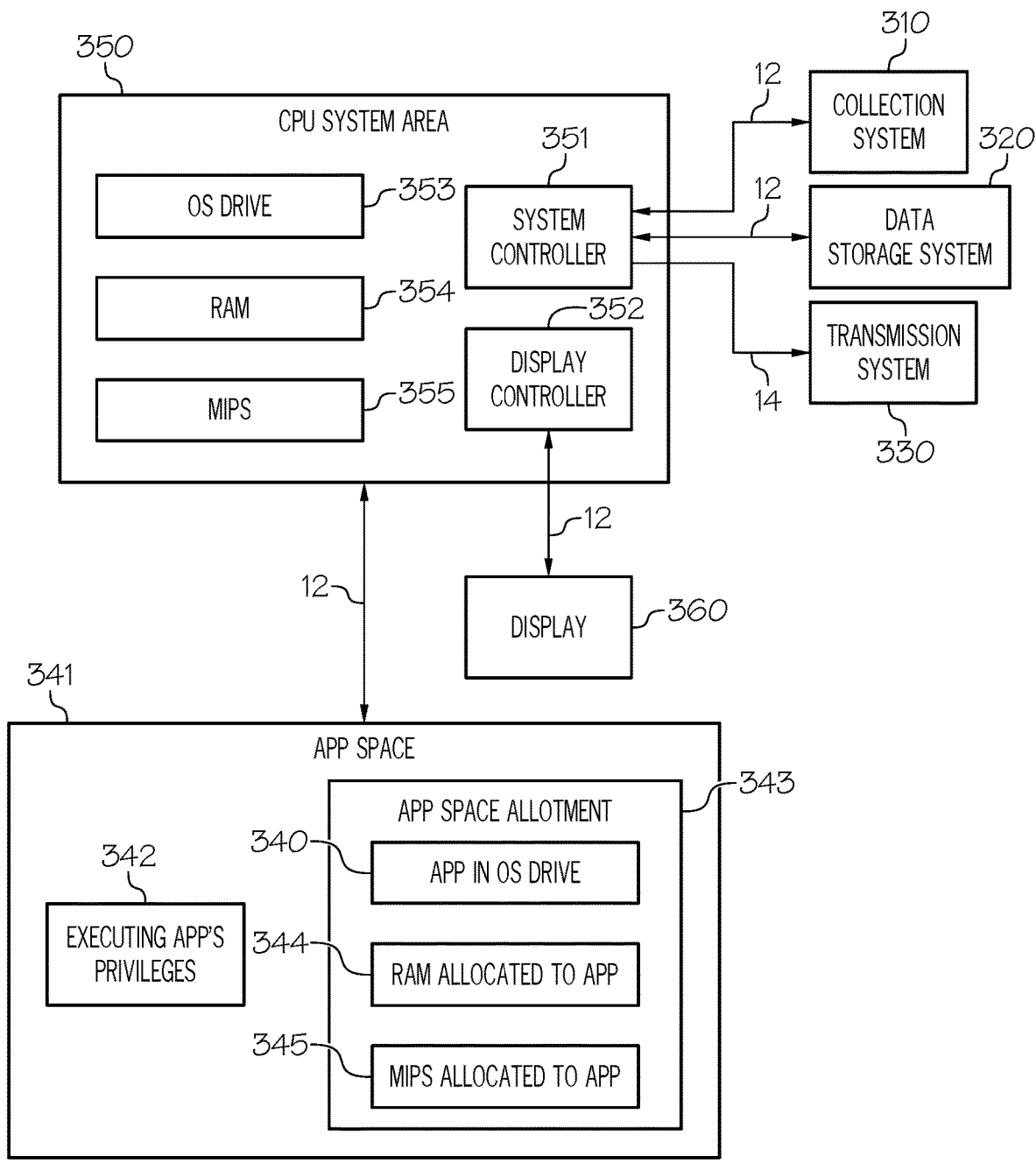
FIG. 3 depicts a block diagram of systems comprising an SDR.

FIG. 3 depicts multiple systems included in an SDR of the disclosed system. The SDR may include a central processor (CPU) that has a dedicated system area 350, having a higher priority/security than other SDR systems. The system area 350 may include an operating system drive (OS Drive) 353, that functions as a high-level operating system and that interacts with and manages various SDR hardware and software systems. The system area 350 may also include random access memory (RAM) 354, and a microprocessor without interlocked pipelined stages (MIPS) 355, as well as a system controller 352 to operate the collection system 310, the data storage system 320 and the transmission system 330, and a display controller 352 to operate a display screen 360. The CPU system area 350 also has an App Space 341, which includes allotted space 343 for specific apps, e.g., the linking app 340. The space allotted to each app includes the app itself 340 located in the OS Drive 353, RAM 344 allocated to the app, and MIPS 345 allocated to the app. Arrows indicate two-way 12 and one-way 14 data flows.

A typical SDR, such as a WBT, used with the disclosed system, may have various hardware components to implement the systems for collecting, processing, storing and transmitting RF signals. For example, data processing is supplied by 8 CPU cores, 512 GPU cores, and 32 GB of RAM. A combined ARM and GPU board, such as those sold by NVIDIA Corp. perform DSP and AI/ML functions. At least two tuners having a sample rate of 50 MHz (61.44 MS/s) are used for tuning the signal. Center frequency range (Threshold) is 50-6000 MHz.

Artificial Intelligence Systems for Signal Detection and Classification

Certain functions of the disclosed invention are carried out by a system of intelligent agents that continually optimizes resources to progressively refine detection and characterization of radiofrequency signals in a given environment. The AI/ML systems used for signal detection and classification herein develop a data repository of an RF environment by extracting features from collected observations on the environment. Then the systems allow a suite of hierarchically organized intelligent agents to access the data repository to perform signal detection and classification. The signal classification system initially separates emitters from each other based on the characteristics of individually detected pulses, and then classifies the emitter groups using measured characteristics of each collection of pulses. These AI systems reduce the data burden and training time required to make fieldable, effective, and highly accurate signal detection capabilities, especially for traditionally difficult-to-capture protocols such as certain frequency agile communications. Using these systems, small SWaP-C footprint equipment can successfully detect, identify and classify a new communications protocol in a matter of minutes.

Figure 4:
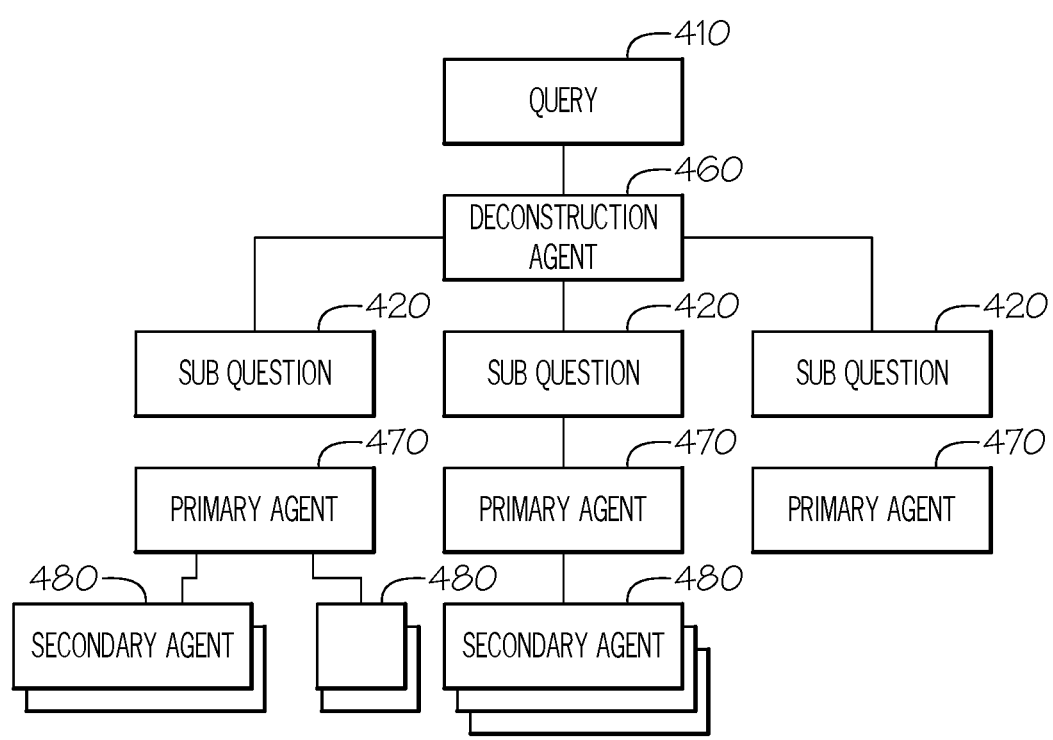
FIG. 4 depicts a flow diagram of artificial intelligence-assisted processes used by an SDR.

With reference to FIG. 4, for signal detection and classification, such systems use predetermined protocols to deconstruct or parse well-defined queries 410. A deconstruction agent 460 analyzes an inquiry and parses it into one more sub-questions 420, depending on the query's complexity. Then the deconstruction agent 460 passes each sub-question to a primary agent 470 based the nature of the sub-question. Examining data stored in a common database, the primary agent 470 assesses whether the current data is sufficient to resolve the sub-question or if additional data is required. If more information is needed, the primary agent seeks assistance from one or more secondary agents 480. Like the primary agent, the secondary agent receives the request and determines whether sufficient information is available to produce its response. Should the secondary agent also need additional information a tertiary agent can be sought, and so forth, until each sub-question is resolved. Upon resolution of each sub-question each primary agent passes its response back to the deconstruction agent, which combines the responses and resolves the inquiry in the form of an output.

Figure 5:
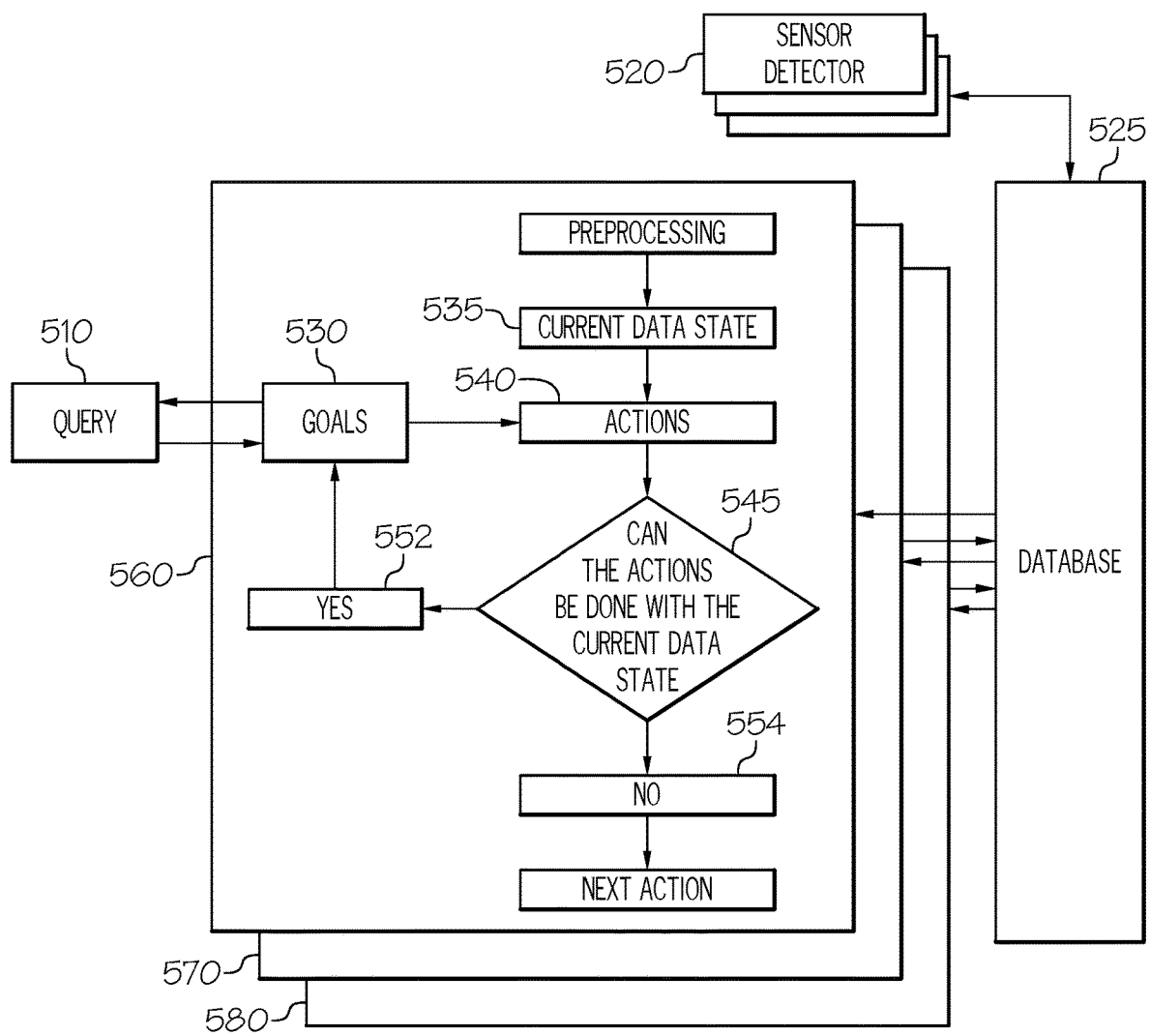
FIG. 5 depicts a flow diagram of artificial intelligence-assisted processes used by an SDR.

With reference to FIG. 5, an AI/ML system as used herein is depicted. The intelligent agents, i.e., deconstruction 560, primary 570, secondary, 580, tertiary (not shown), etc. are communicatively coupled to a database. Sensors 520 of various types capture and house data 525 relevant to a particular examination. The deconstruction agent 560 receives an inquiry 510 and parses it based on a predetermined protocol, which provides a framework to interpret the question and determine what information is necessary and what steps 530 (goals) are required to respond to the query. If the current state of the data 535 is sufficient 552 to support the required actions 540, the system generates a response and reports an output. However, if one or more actions/sub-questions cannot be completed 554 with current data, the deconstruction agent 560 seeks assistance of other agents 570, 580. In doing so the deconstruction agent assigns each sub-question or action to one or more primary agents 570. The primary agent 570 examines available data and determines whether the data is sufficient to resolve the sub-question. If so, the primary agent produces an output and returns it to the database. If the data is insufficient to resolve the sub-question, the primary agent 570 engages one or more secondary agents 580. Each of these secondary agents are tasked to develop or generate the data identified as lacking by the primary agent 570. Should the secondary agent 580 also determine that available data is insufficient for it to complete its task, it can task tertiary agents to generate missing data to allow the secondary agent to respond to the primary agent's request.

As agents produce additional data in response to a need identified by a superior agent, the output is placed in a common data repository 525. Each agent monitors the data repository for material sufficient for it to complete its assigned question. Upon an inferior agent adding new material to the database the superior agent recognizes the inclusion and works on its assigned task. Ultimately, the hierarchal structure provides sufficient information within the database for generation of a responsive output to the original query 510.

Specifically as applied to RF signal detection and classification, agents automatically detect signals, extract them, put them into a database and then accesses that database to provide relevant and actionable information. The agents rapidly assemble the pieces needed to provide relevant decision support information, e.g., is a signal detected, where and when was the signal detected, what class of signal is it, and in some cases, what vehicles are associated with that signal. Sensors, e.g., antennas, gather data that may otherwise resemble noise. Indeed, some frequency agile systems are designed to resemble noise by "hopping" among frequencies at a rate exceeding 80,000 hops per second. In such a system, spectrum accumulation and statistical fingerprint analysis models, are used to provide frequency estimates of RF signals. Such models, or predetermined protocols, establish what data is needed to determine if, for example, a UAV is present in the environment, and respond to such an inquiry.

Figure 6:
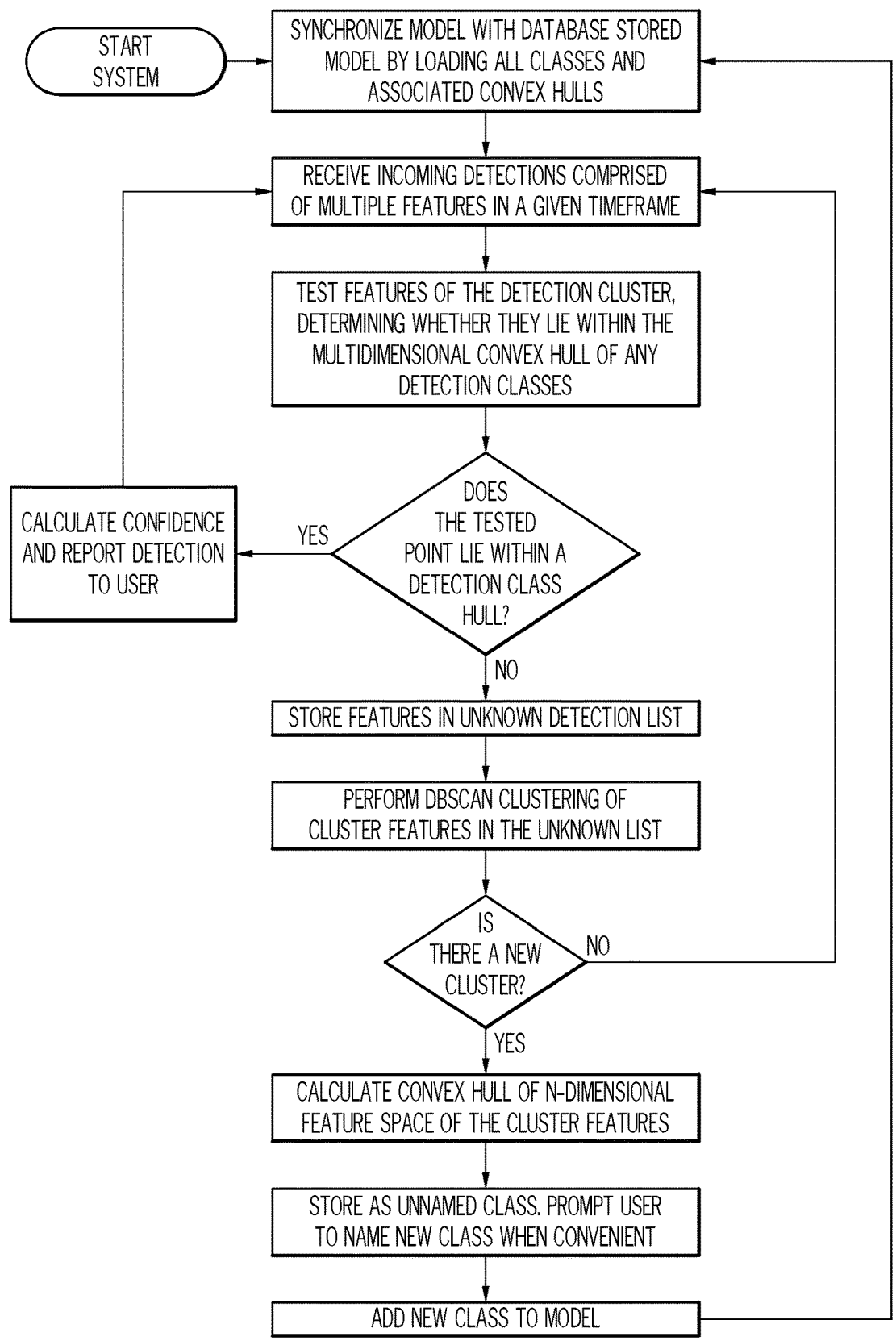
FIG. 6 depicts a flow diagram of artificial intelligence-assisted processes used by an SDR.

The AI/ML systems used herein perform RF signal detection and classification primarily through two algorithms: Density Based Spatial Clustering of Applications with Noise ("DBSCAN"), and Convex Hull. See FIG. 6 for a summary of the process as a block diagram. DBSCAN is a highly effective algorithm for identifying and segregating noise, as well as performing segmenting analysis on signals. DBSCAN operates by finding a finite number of spatially dense clusters in an n-dimensional feature space by constructing groups out of points that are in close proximity. DBSCAN is superior to other comparable clustering algorithms, e.g., k-means, because the number of groups do not need to be specified beforehand, and it can find non-linearly separable clusters. If DBSCAN cannot assign a point to a cluster, it initially labels the point as noise, i.e., unclassified.

The second such algorithm, known as Convex Hull, determines the minimum number of points in a cluster that can form a closed bounding region around all of the points in that cluster. A convex hull can be found algorithmically for a cluster of any number of dimensions. Convex hulls represent cluster boundaries, serving as a decision surface for establishing class membership. By calculating the convex hull boundary for a cluster, the system no longer requires all of the interior points associated with the cluster, which reduces the amount of memory required for storage and reduces the number of calculations needed to locate a new point inside or outside a cluster's boundary.

In operation, the AI/ML system receives data containing one or more features over a sliding window of time. This time window is large enough to allow a sufficient number of data elements or detections to allow the formation of meaningful clusters. The number of features passed into the system determines the number of dimensions in the feature space.

The system then tests each feature or data point against the convex hulls it has constructed from the data. If a point lies inside of a convex hull, the point is deemed a member of the class that the convex hull represents. The system can determine a confidence value for the point by examining the distance between the point and the convex hull surface, as well as the distance between the point and the center point of the cluster. Both distance measurements figure into the confidence value, since one convex hull can envelope another convex hull.

If a point lies outside of all convex hulls, it is stored in a sliding window of unclassified points. The unclassified points are then run though a DBSCAN clustering process to determine if there are any dense regions of points sufficient to create one or more new clusters. These clusters of unclassified points represent new classes (potential signals) that are added the model of the RF environment. Once a new cluster is established, i.e., shows persistence by including a minimum quantity of points during a given timespan, the system generates a convex hull out of the cluster's surface, and the new convex hull is assigned a name, either by the system, an auto generated unique designator, or by a human user.

Once a new class is established, the representative convex hull is added to the model of the RF environment, and is communicated to other intelligent agents residing in other SDRs through a transfer learning process. The DBSCAN and convex hull algorithms make such communication and learning efficient by creating small model files (KB rather than MB) that can be easily transferred between SDRs over low bandwidth communications systems, e.g., a mesh network. Transfer learning allows two or more agents to exchange classes and improved models among themselves, or to share or combine model construction tasks. By multiplying the processing power available to create and improve signal models, transfer learning allows multiple SDRs to learn from a given RF environment in real time. Transfer learning may be performed and orchestrated among networked SDRs either manually, automatically, through the network, or a combination of such organizational means. Transfer learning between models and SDRs is as simple as appending the new convex hull in one model to the set of convex hulls in another model.

While in some cases the system may require the generation of new information to answer an inquiry, in other cases the sensor-collected data is sufficient to answer the inquiry, but is not stored in a form usable by the system. Thus, when a query is issued, "Is a frequency agile UAV operating in a certain region of interest", it must be parsed into resolvable and actionable sub-questions. The AI/ML system parses the question into actionable sub-questions using such protocols as "Within the detected data, are there groupings of time correlated signals". To answer the query, an agent may need to examine pulse lengths, signal bandwidth, pulse power, etc., and analyze the data to identify a geospatial location of the signals. A response from each of a plurality of sub-questions leads to a resolution of the original query.

Figure 7:
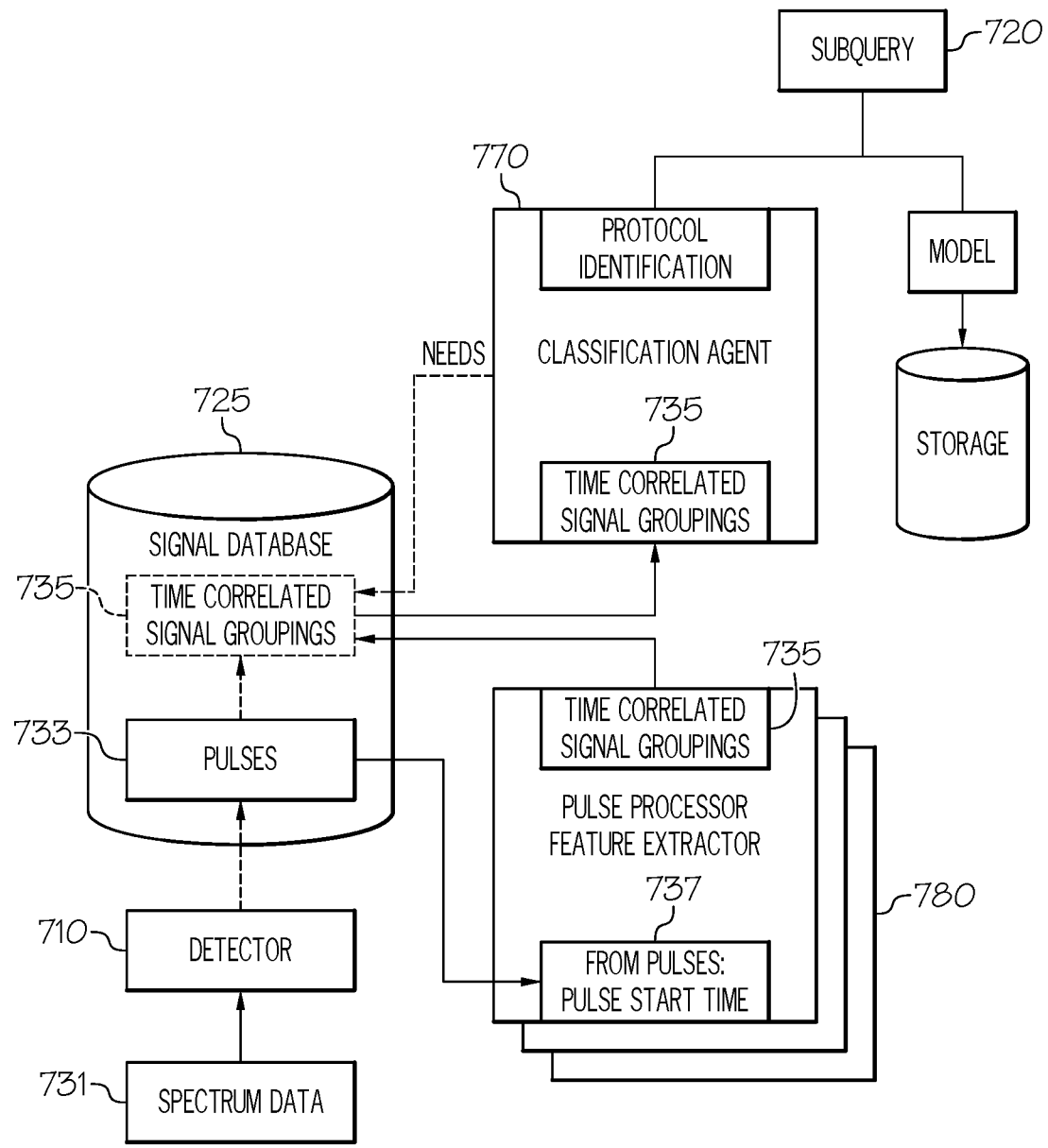
FIG. 7 depicts a flow diagram of artificial intelligence-assisted processes used by an SDR.

For example, with reference to FIG. 7, a subquery is assigned to a primary agent, such as a classification agent 770, to identify time-correlated grouped signals. The classification agent 770, recognizes that time-correlated grouped signals 735 are indicative of a frequency agile system. The classification agent therefore needs, and seeks to determine, whether the signal database 725 includes time-correlated grouped signals. Upon querying the database 725, the primary agent determines that the stored data are pulses 733 and are not time correlated. The primary agent 770 then issues a request to a secondary agent, a pulse processor feature extractor 780, to generate time correlated grouped signals 735 based information present in the database. The secondary agent 780 then seeks pulse start time kernel densities and signal time extents with which it can determine pulse start times 737. While pulse start time kernel densities can be derived from the signal time extents, the signal time extents must be derived from power spectral data, and Signal Frequency Extents which is an output of a complex Fast Fourier Transform. Working backward with a plurality of tertiary agents, a complex FFT modifies the original data 731 to generate power spectral data which in turn feeds the generation of, among other things, signal time extents. The signal time extents are the basis of another agent's generation of pulse start time kernel density data which, when combined with the signal time extents, forms pulse start time correlations 737.

Because of the tertiary agents' activities, the database now includes pulse start times 737 which the secondary agent 780 can use to generate time correlation-based signal groupings 735. These groupings are generated and placed in the database 725. After the inferior agents complete their tasks, the primary classification agent 770 now has the data (time correlation-based signal groups 735), required to return to the deconstruction agent a response to the subquery, "Have frequency agile signals been detected". This response combined with other information can be combined to output a response to the initial query, "Is a frequency agile UAV operating in a certain region of interest?"

SDR Linking

Figure 8:
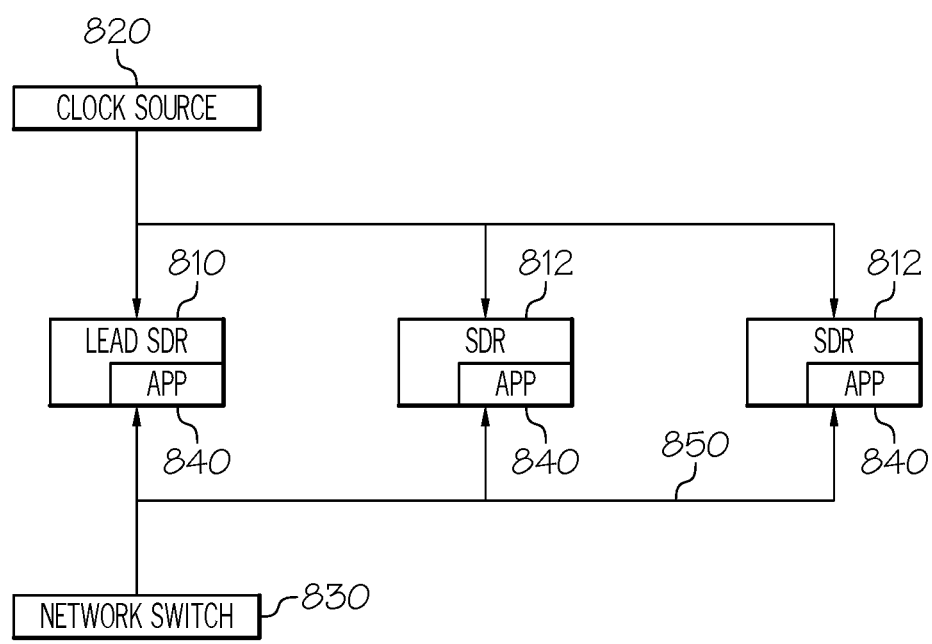
FIG. 8 depicts a flow diagram describing at least a portion of an embodiment of the disclosed invention.

With reference to FIG. 8, a flow diagram of a linked system of SDRs is depicted. A number (three are depicted) of SDRs 810, 812 are deployed in an RF environment. Each SDR is connected to, and configured to communicate with, a network 850 organized based on one or more Internet communications protocols, e.g., Internet Protocol (IP), Transmission Control Program (TCP), User Datagram Protocol (UDP), etc. The network 850 may be a wired connection, e.g., an ethernet connection, or may be wireless, e.g., WiFi, cellular. In some embodiments, the network 850 is a mesh network, in which network nodes, i.e., SDRs, connect directly, dynamically and hierarchically to as many other nodes as possible, and cooperate to efficiently route data throughout the network. Each SDR configured to participate in a linked network of the disclosed invention hosts a linking application 840 designed to operate each SDR as part of a cohesive system of SDRs. Additional prior coordination is not required to set up the system: as long as the SDR 810, 812 is communicating with an IP network and hosts the linking application 840, it can participate in the system, with an upper limit of 128 SDRs participating at one time.

A user operating the linked system identifies a Lead SDR 810 that is deployed in the RF environment the user desires to sample. The Lead SDR is does not require different capabilities from other SDRS on the network, and may be any SDR that is connected to the network and hosts the linking app. Once designated, the Lead SDR acts as a command and control station for the linked system. The user controls the linked system through a graphical user interface displayed by a general or special purpose computer that is also connected to the network. Communication with the Lead SDR is through the network, and is routed through one or more network switches 830 (one is depicted).

The user instructs the Lead SDR to record RF signals in the RF environment to be sampled. Such instructions include a sample start time, being the time at which the user wants to begin recording the RF environment, and a sample stop time, being the time at which the user wants to cease recording the RF environment. Other user instructions may vary in detail, and may include the RF spectrum to be covered, a center frequency, a bandwidth, and a sample rate. Each individual SDR 810, 812 has a bandwidth that it is capable of covering, for example 100 MHz of RF spectrum. Acting in concert, the disclosed system aggregates the individual SDR bandwidths into a system frequency band of RF spectrum. This system frequency band is a subset of frequencies between, for example, 100 kHz and 40 GHz, and is up to 2 GHz wide. In other words, the combined coverage of the individual SDRS has an instantaneous bandwidth of 2 GHz. As SDR capabilities evolve, individual SDR bandwidths, aggregate frequency range, and instantaneous bandwidths will increase.

Once the Lead SDR is tasked by a user, the linking application 840 establishes a reference time using a clock signal generator 820. The clock signal generator may be internal to the SDR, may be a clock signal generator connected to the network, or may be a clock signal from a GPS satellite or other broadcast source. Without necessarily knowing what SDR resources are available, and without prior coordination, the Lead SDR communicates the reference time and recording instructions to the network 850. The Lead SDR communicates through multicast messages sent with the user datagram protocol (UDP). The model for UDP communications is simple, connectionless, and requires few protocol mechanisms. For example, prior communications are not required to establish data paths, such paths can occur instantaneously with low bandwidth messaging. Using such protocols, the Lead SDR is able to perform command and control functions over member SDRS 812 in the linked system using a data throughput of as little as 75 thousand bits per second (Kbps).

SDRs 812 on the network 850 join the linked system through an auto-discovery process. Member SDRs on the same communications channel as the Lead SDR will receive the UDP message even if the two units had not communicated previously. Once the Lead SDR sends the time-stamped recording instruction over UDP multicast, all of the SDRs on the network would receive the message, and if loaded with the linking application, would coordinate timing and record the RF spectrum as instructed. The network auto-discovery feature enabled by use of UDP communications protocols and the disclosed linking application provides important operational advantages, including the ability to rapidly coordinate the available SDRs for participation in the network with only minimal knowledge of the configuration of the network, and minimal knowledge of SDR configuration. Namely, if an SDR is connected to a network with the lead SDR and is loaded with the application, it is available to be tasked as part of the linked network. The user receives feedback through the graphical user interface about the particular SDRS on the network that join the linked system for a given recording task, as well as when the participating SDRS recorded, and what they recorded.

Synchronization of recording start times and stop times is accomplished through use of the reference time communicated by the Lead SDR 810. The linking application operating on each member SDR 812 uses the reference time to synchronize each member SDR's internal clock with the Lead SDR so that recordation is precisely coordinated. The clock source 820 broadcasts a pulse per second (PPS) signal to the network 850. The PPS is a signal with a width of less than a second, and is characterized by a sharp or abrupt edge that repeats each second. The Lead SDR, through the linking application, selects a time that is offset, for example, until the next full PPS signal from the clock source, and uses this time as the reference time. By offsetting the reference time until the next full PPS signal, the Lead SDR ensures that member SDRS begin and cease recording with precise coordination.

Figure 9:
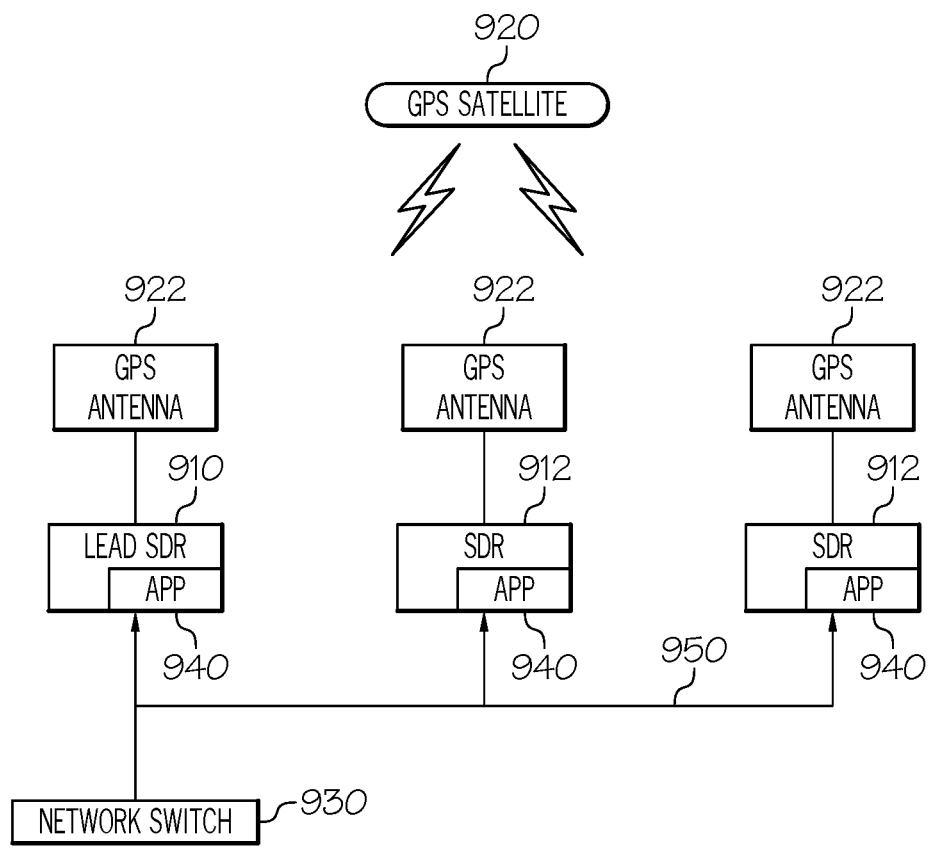
FIG. 9 depicts a flow diagram describing at least a portion of an embodiment of the disclosed invention.

With reference to FIG. 9, another embodiment of the disclosed SDR linking system is depicted. In this embodiment, rather than using a clock source that communicates through the Lead SDR 910, the SDRS 912 connected to the network 950 also include a Global Positioning System (GPS) antenna 922 configured to communicate with one or more GPS satellites 920. The SDRs 910, 912 use the clock on board the GPS satellite 920 as a reference time for coordinating RF environmental sampling start times and stop times.

The disclosed invention allows for a plurality of SDRs to be combined into a single system to simultaneously record RF signals in an RF environment to be played back, or to be stored for later signal analysis and processing. Using multiple SDRs for RF environment sampling provides two main advantages. Since an individual SDR has a limited frequency range, and limited instantaneous bandwidth, e.g., 100 MHz, combining multiple SDRs with different or partially overlapping frequency ranges allows coverage of all frequencies, for example, between 100 kHz and 40 GHz, and provides, e.g., up to 2 GHz of instantaneous bandwidth. Such capabilities typically require large rack-mounted systems costing in excess of $1 million each. The combined capabilities of a plurality of SDRs linked according to the disclosed invention therefore allows a user to record all, or nearly all, of the RF emissions in a given RF environment. Further, the small SWaP-C footprint of an individual SDR, and the ability to use distributed SDRs located throughout an RF environment, provides superior flexibility and geographic coverage for RF environment sampling. Further, dismounted systems allow for broader use cases since individual SDRs can be deployed and moved where needed, and separated by distances in the multiple kilometer range. Individual SDRS may be co-located at a single location, or at least a subset of SDRs can be distributed at regular or irregular intervals around the geographic area selected for coverage. SDRS participating in the linked system may have a fixed location, may be portable, or mounted on a vehicle for full mobility.

The disclosed linked network of SDRs is capable of performing a number of functions due to the substantial coverage of RF spectrum, as well as the instantaneous bandwidth available. Such functions include total band monitoring, wherein the linked system analyzes in real time all of the RF signals emitted into the RF environment in a unit of time. Disclosed linked systems can also perform total band capture, wherein the system records all of the RF signals emitted into the RF environment in a unit of time. The RF spectrum coverage provided by a linked system also allows the creation of accurate and comprehensive simulations of an RF environment. Another application is the identification and simulation of electronic interference, electronic noise, intentional jamming, etc. that might be present in an RF environment. Such interference and noise detection is made possible by the linked system's ability to capture and rapidly analyze all of the RF signals in an environment, so that noise, interference and or jamming may be distinguished from communications signals. Finally, the disclosed linked system allows distributed quality of service evaluations or wireless networks, such as cellular networks.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

An exemplary system for implementing the invention may include a general purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random-access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

While there have been described above the principles of the present invention in conjunction with linked SDRs, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

While this invention has been described in terms of several embodiments, there are alterations, modifications, permutations, and substitute equivalents, which fall within the scope of this invention. Although subsection titles have been provided to aid in the description of the invention, these titles are merely illustrative and are not intended to limit the scope of the present invention. In addition, where claim limitations have been identified, for example, by a numeral or letter, they are not intended to imply any specific sequence.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

This has been a description of the disclosed invention along with a preferred method of practicing the invention, however the invention itself should only be defined by the appended claims.

What is claimed is:

1. A method for linking individual software-defined radios (SDR) into a system of SDRs, the method comprising:
    configuring a plurality of SDRs to communicate with a network, wherein each of the plurality of SDRs is a software-defined radiofrequency (RF) digitization and collection device designed to record and play back signals in a band of RF spectrum, and wherein the network is organized based on one or more Internet communications protocols;
    hosting on each of the plurality of SDRs a linking application (app) designed to operate each SDR as part of a system;
    identifying a lead SDR from among the plurality of SDRs;
    directing the lead SDR to record a sample of RF signals in an RF environment, wherein the linking app hosted on the lead SDR establishes a reference time using a clock signal generator, and sends a message to the network to record the sample in coordination with the reference time; and recording the sample in coordination with the reference time, wherein a subset of the plurality of SDRs joins the system automatically to record the sample.

2. The method of claim 1, wherein the linking app hosted on the lead SDR directs the linking apps hosted on the subset of SDRs.

3. The method of claim 1, wherein the method further comprises communicating with the lead SDR through a network switch.

4. The method of claim 1, wherein the clock signal generator is one of the following: one or more global positioning system (GPS) satellites, a clock source connected to the network, or a clock source internal to an SDR.

5. The method of claim 1, wherein the plurality of SDRs is co-located.

6. The method of claim 1, wherein one or more of the plurality of SDRs is mobile.

7. The method of claim 1, wherein the network is a wireless mesh network.

8. The method of claim 1, wherein the lead SDR controls the system using a data throughput of 75 thousand bits per second (Kbps) or more.

9. The method of claim 1, wherein the band of RF spectrum recorded by each of the subset of SDRs is 100 million cycles per second (MHz) wide.

10. The method of claim 1, wherein the bands are aggregated into a system frequency band, and wherein the system frequency band is a subset of radiofrequencies between 100 thousand cycles per second (kHz) and 40 billion cycles per second (GHz).

11. The method of claim 10, wherein the system frequency band is 2 GHz wide.

12. The method of claim 1, wherein the system is configured to perform one or more of the following: total band monitoring, total band capture, RF environment simulation, interference identification, interference simulation, and distributed quality of service evaluation of wireless networks.

13. A system for recording radiofrequency (RF) transmissions using a linked group of SDRs, wherein the lead SDR being directed to record a sample of RF signals in an RF environment, the system comprising:

a plurality of SDRs, wherein each of the plurality of SDRs is a software-defined radiofrequency (RF) digitization and collection device designed to record and play back signals in a band of RF spectrum, wherein each of the plurality of SDRs hosts a linking application (app) for operating the linked group, and wherein one of the plurality of SDRs is identified as a lead SDR;

a network organized based on one or more Internet communications protocols, wherein the plurality of SDRs communicates with the network;

a clock signal generator configured to communicate with the lead SDR; and a network switch for communicating with the lead SDR, wherein the linking app hosted on the lead SDR establishes a reference time using the clock signal generator, and sends a message to the network to record the sample in coordination with the reference time, and wherein the sample being recorded in coordination with the reference time by the plurality of SDRs on the network, and wherein a subset of the plurality of SDRs joins the system automatically to record the sample.

14. The system of claim 13, wherein the linking app hosted on the lead SDR directs the linking apps hosted on the subset of SDRs.

15. The system of claim 13, wherein the clock signal generator is one of the following: one or more global positioning system (GPS) satellites, a clock source connected to the network, or a clock source internal to an SDR.

16. The system of claim 13, wherein the plurality of SDRs is co-located.

17. The system of claim 13, wherein one or more of the plurality of SDRs is mobile.

18. The system of claim 13, wherein the network is a wireless mesh network.

19. The system of claim 13, wherein the lead SDR controls the linked group using a data throughput of 75 thousand bits per second (Kbps) or more.

20. The system of claim 13, wherein the band is 100 million cycles per second (MHz) wide.

21. The system of claim 13, wherein the band recorded by each of the subset of SDRs a group frequency band, and wherein the group frequency band is a subset of radiofrequencies between 100 thousand cycles per second (kHz) and 40 billion cycles per second (GHz).

22. The system of claim 21, wherein the group frequency band is 2 GHz wide.

23. The system of claim 13, wherein the system is configured to perform one or more of the following: total band monitoring, total band capture, RF environment simulation, interference identification, interference simulation, and distributed quality of service evaluation of wireless networks.

* * * * *